United States Patent
Chen

(10) Patent No.: US 6,422,780 B2
(45) Date of Patent: Jul. 23, 2002

(54) STRUCTURE FOR CONNECTING A TOOL WITH A GRIP

(76) Inventor: Pao-Lu Chen, 5F, No. 10, Lane 46, Hsin-Jih 7th Street, Ta-Li City, Taichung Hsien (TW)

( * ) Notice: Subject to any disclaimer, the term of this patent is extended or adjusted under 35 U.S.C. 154(b) by 55 days.

(21) Appl. No.: 09/734,919

(22) Filed: Dec. 13, 2000

Related U.S. Application Data

(63) Continuation-in-part of application No. 09/339,846, filed on Jun. 25, 1999, now abandoned.

(51) Int. Cl.$^7$ ................................................. B26B 13/04
(52) U.S. Cl. ...................... 403/294; 403/309; 403/317; 403/318; 403/319; 403/359.5; 403/359.6; 403/375; 30/254; 30/329; 30/341
(58) Field of Search .......................... 30/254, 341, 329, 30/337, 339, 330, 340, 42, 343, 344, 333, 143; 403/294, 309, 317, 318, 319, 359.5, 359.6, 375

(56) References Cited

U.S. PATENT DOCUMENTS

| | | | | | |
|---|---|---|---|---|---|
| 2,408,567 A | * | 10/1946 | Mauch | ...................... | 30/342 X |
| 2,966,931 A | * | 1/1961 | Dreier | ...................... | 30/329 X |
| 3,621,899 A | * | 11/1971 | Hula | ........................ | 30/339 X |
| 3,922,784 A | * | 12/1975 | Prince et al. | .............. | 30/329 X |
| 4,092,918 A | * | 6/1978 | Hamisch, Jr. | ................ | 101/288 |
| 4,304,426 A | * | 12/1981 | Francis | ......................... | 285/323 |
| 4,400,878 A | * | 8/1983 | Vaudreuil | ...................... | 30/329 |
| 4,738,446 A | * | 4/1988 | Miles | ...................... | 403/318 X |
| 4,777,725 A | * | 10/1988 | Hirsch | ........................ | 30/337 X |
| 5,454,165 A | * | 10/1995 | Thompson et al. | ........ | 30/340 X |
| 5,575,071 A | * | 11/1996 | Phillips et al. | ............ | 30/337 X |
| 5,657,541 A | * | 8/1997 | Hickok et al. | ............. | 30/337 X |
| 6,045,292 A | * | 4/2000 | Placide et al. | ............ | 403/359.6 |

* cited by examiner

*Primary Examiner*—Christopher J. Novosad
(74) *Attorney, Agent, or Firm*—Rosenberg, Klein & Lee

(57) ABSTRACT

A structure for connecting a tool with a grip, including an insertion rod, an outer sheath and a fastening ring. The insertion rod is inserted in the outer sheath. One side of the insertion rod has a projecting block formed with a transverse recess. The outer sheath is formed with a split in which the projecting block of the insertion rod is inserted. A periphery of the outer sheath is formed with an annular groove corresponding to the transverse recess of the projecting block. The inner circumference of the fastening ring is formed with an annular rib fitted in the annular groove. The rib is formed with a dent having a width slightly larger than the width of the split. When rotating the fastening ring, the rib is engaged in the transverse recess of the projecting block to restrict the insertion rod from displacement. When the dent of the rib is aligned with the transverse recess of the projecting block, the projecting block can be passed therethrough, permitting the insertion rod to be extracted out of the outer sheath.

3 Claims, 4 Drawing Sheets

STRUCTURE FOR CONNECTING A TOOL WITH A GRIP

CROSS-REFERENCE TO RELATED APPLICATION

This application is a Continuation-In-Part application of Ser. No. 09/339,846, file Jun. 25, 1999, and entitled "CONNECTING STRUCTURE FOR A TOOL AND A GRIP", now abandoned.

BACKGROUND OF THE INVENTION

The present invention is related to a structure for connecting a tool with a grip. The connecting structure includes an insertion rod which is easily detachably inserted in and connected with an outer sheath. In addition, the connecting structure is not subject to rusting and free from clogging.

FIGS. 6 and 7 show a conventional gardening tool. In order to elongate the length of the gardening tool, save application force and replaceably connect the tool with the grip 9, a tool stem 91 of the tool is fitted into a sleeve 92 of the grip 9 to increase the length of the tool. The sleeve 92 is formed with a dent 93. A spring 94 and a pushing pin 95 pushed by the spring 94 are disposed in the dent 93. When the sleeve 92 is inserted into the grip 9, the pushing pin 95 is inserted and engaged in a fixing hole 96 of the grip 9. However, the spring 94 is made of iron material and is subject to rusting. As a result, the rust tends to clog the dent 93 and makes it uneasy to push out or press in the pushing pin 95. Therefore, it will be difficult to connect the sleeve 92 with the grip 9 or disconnect the sleeve 92 from the grip 9. Also, it often takes place that the pushing pin 95 cannot be pushed out by the spring 94 and the grip 9 is detached from the sleeve 92.

SUMMARY OF THE INVENTION

It is therefore a primary object of the present invention to provide a structure for connecting a tool with a grip. The outer sheath is formed with a split in which the projecting block of the insertion rod is inserted. A periphery of the outer sheath is formed with an annular groove corresponding to the transverse recess of the projecting block. The inner circumference of the fastening ring is formed with an annular rib fitted in the annular groove. The rib is formed with a dent having a width slightly larger than the width of the split. When rotating the fastening ring, the rib is engaged in the transverse recess of the projecting block to restrict the insertion rod from displacement. When the dent of the rib is aligned with the transverse recess of the projecting block, the projecting block can be passed therethrough, permitting the insertion rod to be extracted out of the outer sheath.

The present invention can be best understood through the following description and accompanying drawings wherein:

DETAILED DESCRIPTION OF THE PREFERRED EMBODIMENT

Figure 1:
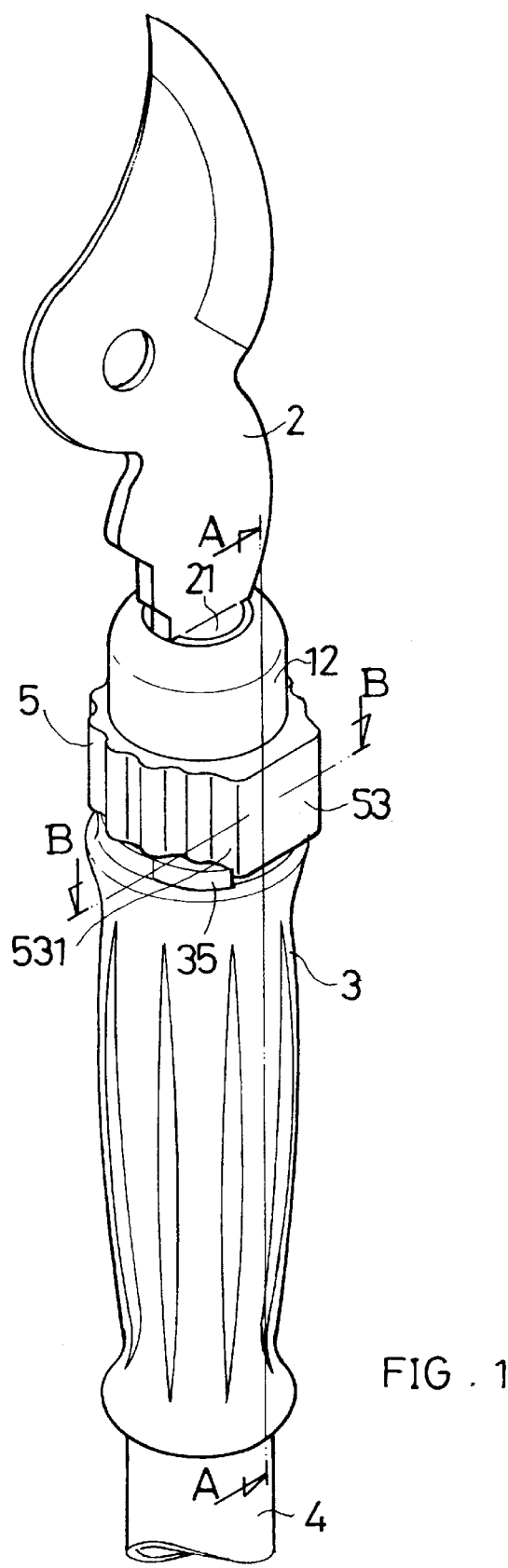
FIG. 1 is a perspective assembled view of the present invention.
Figure 2:
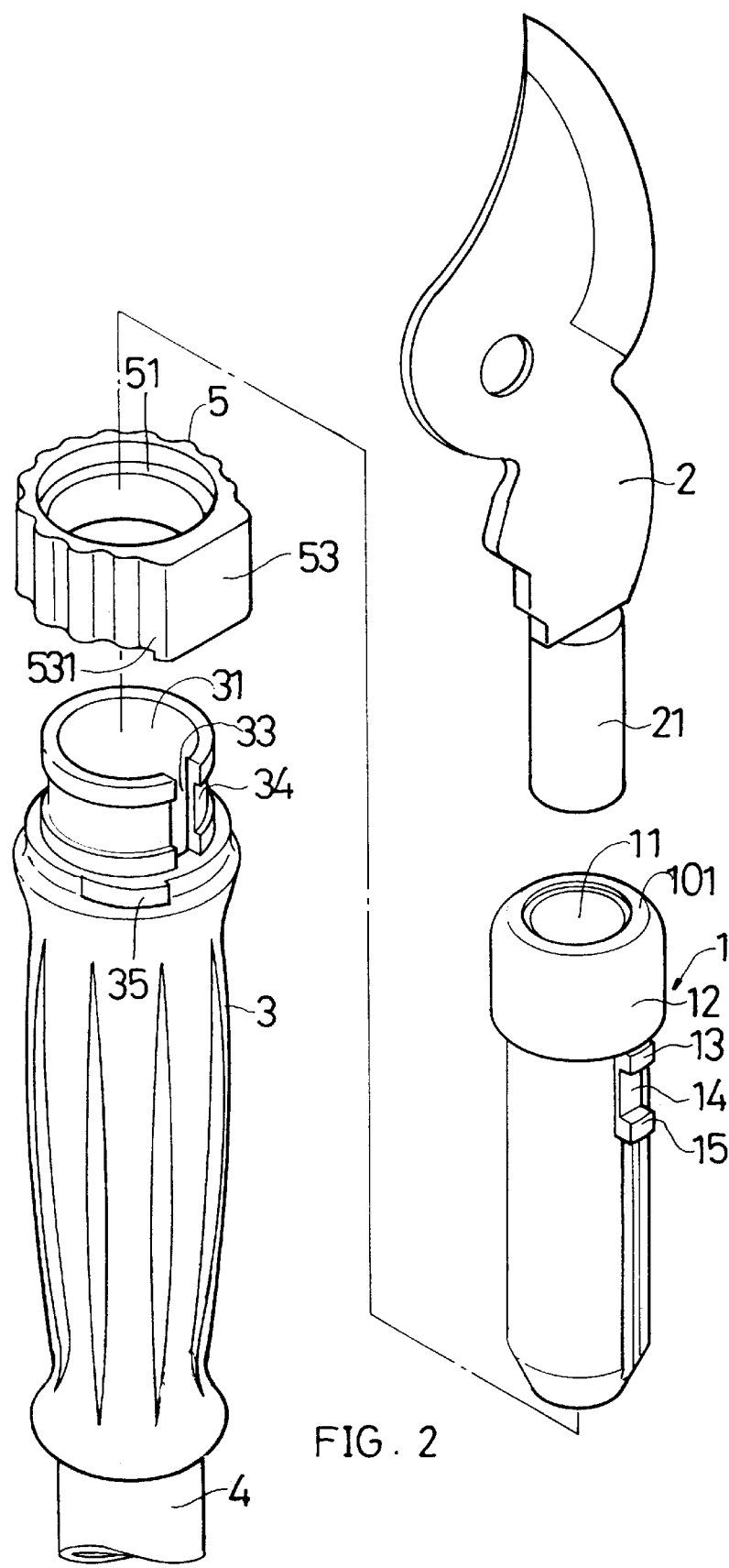
FIG. 2 is a perspective exploded view of the present invention.
Figure 3:
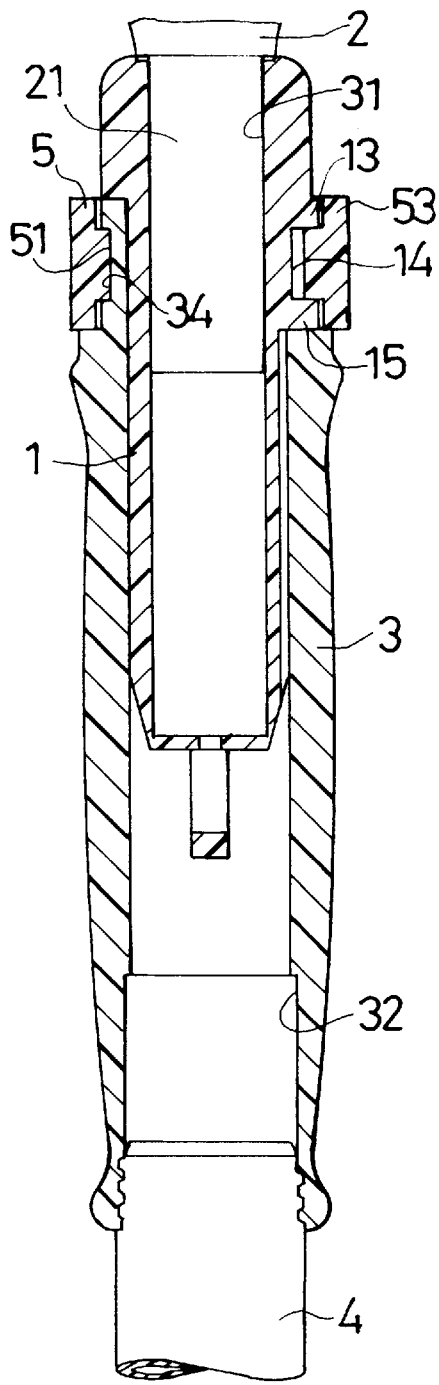
FIG. 3 is a sectional view taken along line A—A of FIG. 1.
Figure 4:
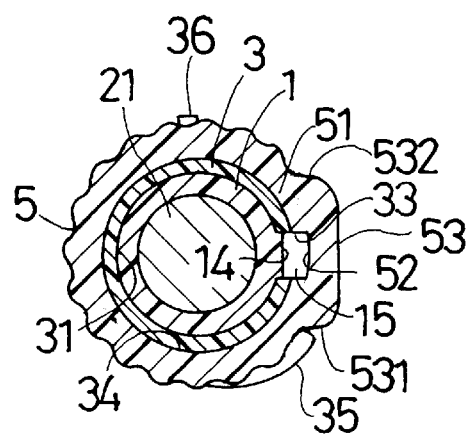
FIG. 4 is a sectional view taken along line B—B of FIG. 1.
Figure 5:
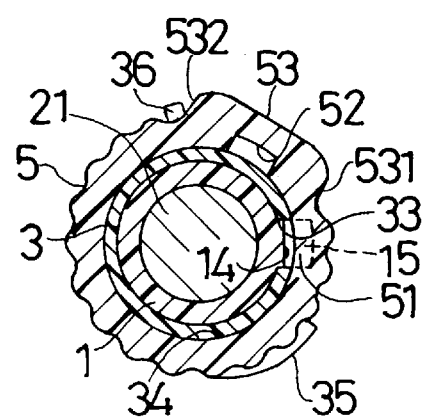
FIG. 5 is a view according to FIG. 4, showing that the fastening ring is rotated.
Figures 6, 7:
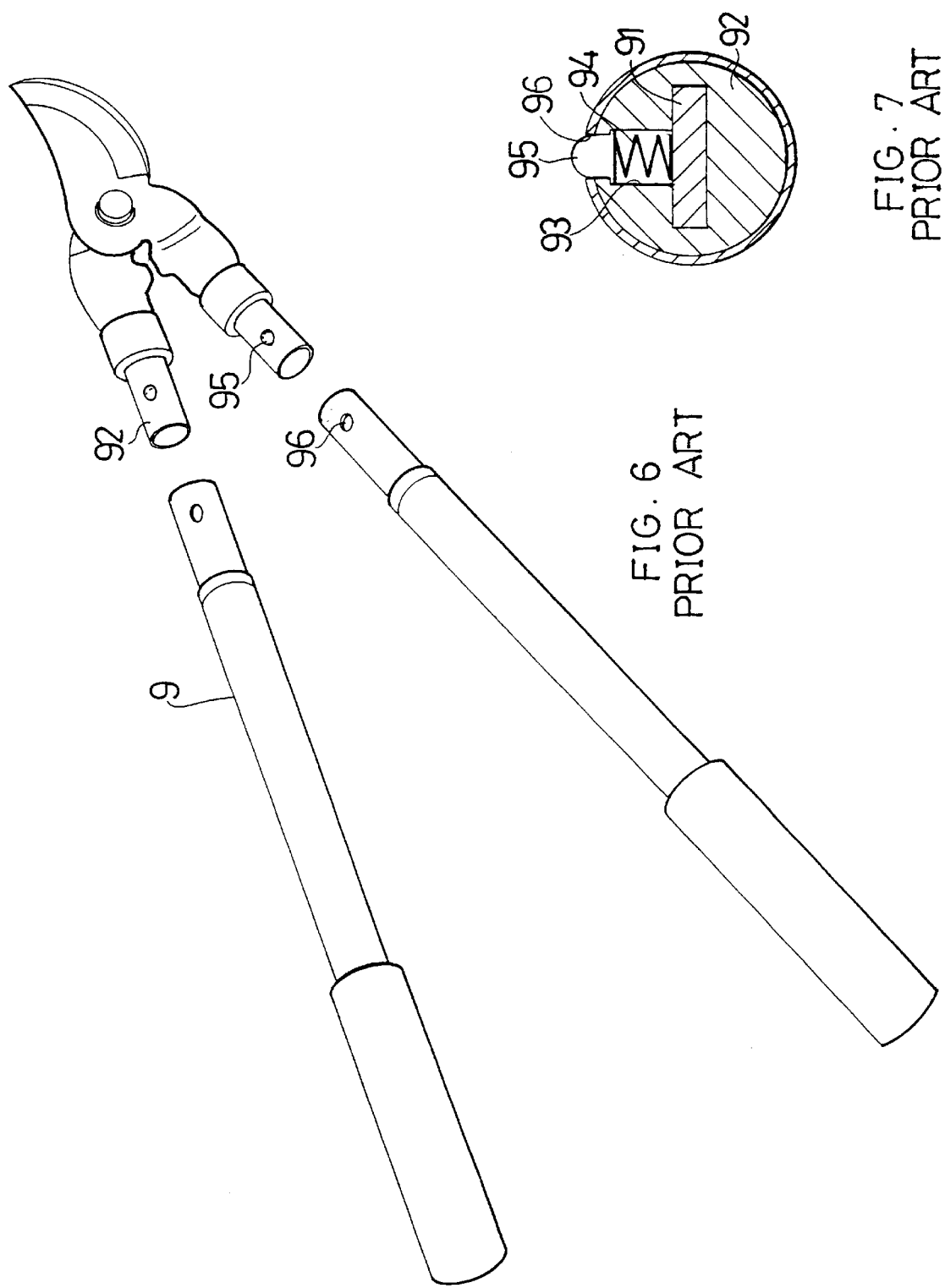
FIG. 6 is a perspective exploded view of a conventional tool and grip.
FIG. 7 is a sectional assembled view of the conventional tool and grip.

Please refer to FIGS. 1 to 5. The structure for connecting a tool with a grip of the present invention includes:

an insertion rod 1, a top section 101 of the insertion rod 1 being formed with a socket 11 for inserting a tool 2 therein, the tool 2 having a connecting section 21 adapted to be inserted into the socket 11 and connected with the insertion rod 1, the top section 101 of the insertion rod 1 being formed with a flange 12, one side of the flange 12 having a downward extending projecting block 13, a middle portion of the projecting block 13 being formed with a transverse recess 14, a lower projecting block 15 being formed on lower side of the transverse recess 14;

an outer sheath 3, the interior of the outer sheath 3 including an upper receptacle 31 and a lower receptacle 32, a grip 4 being adapted to be inserted into the lower receptacle 32, the insertion rod 1 being adapted to be inserted into the upper receptacle 31, one side of the outer sheath 3 being formed with a downward extending split in which the projecting block 13 of the insertion rod 1 is inserted, the periphery of the outer sheath 3 being formed with an annular groove 34 passing through the split 33, the annular groove 34 being such positioned as to cooperate with the transverse recess 14 of the projecting block 13 inserted in the split 33; and a fastening ring 5 fitted on the outer sheath 3, the inner circumference of the fastening ring 5 being formed with an annular rib 51 corresponding to the annular groove 34 and having a shape complementary to the shape of the annular groove 34, the rib 51 being formed with a dent 52 having a width slightly larger than the width of the split 33 for the lower projecting block 15 of the insertion rod 1 to pass through the dent 52, the outer circumference of the fastening ring 5 being formed with a projecting section 53 for a user to easily turn the fastening ring 5. The outer sheath 3 is further formed with a left and a right engaging blocks 35, 36. When the dent 52 of the fastening ring 5 is aligned with the split 33 of the outer sheath 3 and the rib 51 of the fastening ring 5 entirely blocks the split 33, the left and right engaging blocks 35, 36 are respectively positioned on the left and right side edges 531, 532 of the projecting section 53. The left and right engaging blocks 35, 36 serve to stop the projecting section 53 and locate the fastening ring 5.

Please refer to FIGS. 2 to 5. In use of the present invention, first the fastening ring 5 is rotated to make the left side edge 531 of the projecting section 53 thereof leant against and stopped by the left engaging block 35. At this time, the dent 52 of the fastening ring 5 is aligned with the split 33 of the outer sheath 3. When the insertion rod 1 is inserted into the receptacle 31, the projecting block 13 of the insertion rod 1 is aligned with the split 33 of the outer sheath 3 and then the fastening ring 5 is rotated to make the right side edge 532 of the projecting section 53 thereof leant against and stopped by the right engaging block 36. At this time, the rib 51 of the fastening ring 5 is engaged in the split 33 of the outer sheath 3 and the transverse recess 14 of the insertion rod 1 to stop the lower projecting block 15 and restrict the insertion rod 1 from displacement. Therefore, the tool 2 is connected with the outer sheath 3. When taking off the insertion rod 1, the user only needs to rotate the fastening ring 5 to make the left side edge 531 of the projecting section 53 thereof leant against and stopped by the left engaging block 35. At this time, the dent 52 is aligned with the split 33 and the lower projecting block 15 is free from stop, permitting the insertion rod 1 to be extracted out of the outer sheath 3.

The insertion rod 1, outer sheath 3 and fastening ring 5 are all made of plastic material which is not subject to rusting and free from clogging. Therefore, the tool 2 can be more conveniently and easily connected with the grip 4.

In conclusion, the outer sheath 3 is formed with a split 33 for the projecting block 13 of the insertion rod 1 to insert therein. Also, the outer sheath 3 is formed with an annular groove 34 corresponding to the transverse recess 14 of the projecting block 13. The annular rib 51 of inner circumference of the fastening ring 5 is fitted in the annular groove 34. The rib 51 is formed with a dent 52 having a width slightly larger than the width of the split 33. When rotating the fastening ring 5, the rib 51 is engaged in the transverse recess 14 of the projecting block 13 to stop the lower projecting block 15 and restrict the insertion rod 1 from displacement. When the dent 52 is aligned with the transverse recess 14 of the projecting block 13, the lower projecting block 15 can be passed therethrough, permitting the insertion rod 1 to be extracted out of the outer sheath 3. Therefore, the insertion rod 1 is easily detachably connected with the outer sheath 3.

The above embodiment is only used to illustrate the present invention, not intended to limit the scope thereof. Many modifications of the above embodiment can be made without departing from the spirit of the present invention.

What is claimed is:

1. A structure for connecting a tool with a grip, comprising:

an insertion rod, a top section of the insertion rod being formed with a socket for inserting a tool therein, a top section of the insertion rod being formed with a flange, one side of the flange having a downward extending projecting block, a middle portion of the projecting block being formed with a transverse recess, a lower projecting block being formed on lower side of the transverse recess;

an outer sheath, an interior of the outer sheath including a receptacle for inserting the grip therein, one side of the outer sheath being formed with a downward extending split in which the projecting block of the insertion rod is inserted, a periphery of the outer sheath being formed with an annular groove passing through the split, the annular groove being such positioned as to cooperate with the transverse recess of the projecting block inserted in the split; and a fastening ring fitted on the outer sheath, an inner circumference of the fastening ring being formed with an annular rib corresponding to the annular groove and having a shape complementary to the shape of the annular groove, the rib being formed with a dent having a width slightly larger than the width of the split for the lower projecting block of the insertion rod to pass through the dent.

2. A structure for connecting a tool with a grip as claimed in claim 1, wherein an outer circumference of the fastening ring is formed with a projecting section for a user to easily turn the fastening ring.

3. A structure for connecting a tool with a grip as claimed in claim 2, wherein the outer sheath is further formed with an engaging block, whereby when the dent of the fastening ring is aligned with the split of the outer sheath, the engaging block serves to stop a side edge of the projecting section and locate the fastening ring.

* * * * *